United States Patent
Gao et al.

(10) Patent No.: US 9,843,411 B2
(45) Date of Patent: Dec. 12, 2017

(54) SYSTEM AND METHOD FOR RATE ADAPTATION BASED ON TOTAL NUMBER OF SPATIAL STREAMS IN MU-MIMO TRANSMISSIONS

(71) Applicant: QUALCOMM Incorporated, San Diego, CA (US)

(72) Inventors: Qinghai Gao, Sunnyvale, CA (US); Nathaniel David Houghton, San Jose, CA (US); Ahmed Ragab Elsherif, San Jose, CA (US); Ehab Tahir, Mississauga (CA)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/132,990

(22) Filed: Apr. 19, 2016

(65) Prior Publication Data

US 2017/0302401 A1 Oct. 19, 2017

(51) Int. Cl.
*H04L 1/00* (2006.01)
*H04B 7/0452* (2017.01)
*H04W 72/08* (2009.01)

(52) U.S. Cl.
CPC .......... *H04L 1/0003* (2013.01); *H04B 7/0452* (2013.01); *H04W 72/085* (2013.01)

(58) Field of Classification Search
CPC ............ H04L 25/03343; H04L 1/0003; H04L 1/0009; H04L 2025/03426; H04L 5/0057; H04B 7/0452; H04W 72/085
See application file for complete search history.

(56) References Cited

U.S. PATENT DOCUMENTS

2011/0305209 A1 12/2011 Merlin et al.
2012/0120839 A1* 5/2012 Liu ................ H04L 1/0026
370/252

(Continued)

FOREIGN PATENT DOCUMENTS

WO WO-2011112745 9/2011
WO WO-2012070872 A1 5/2012
WO WO-2013081430 A1 6/2013

OTHER PUBLICATIONS

Cheng Y., et al., "An Efficient Transmission Strategy for the Multicarrier Multiuser MIMO Downlink," IEEE Transactions on Vehicular Technology, Feb. 2014, vol. 63, No. 2, pp. 628-642.

(Continued)

*Primary Examiner* — Vineeta Panwalkar
(74) *Attorney, Agent, or Firm* — Loza & Loza LLP

(57) ABSTRACT

Wireless node selects modulation coding schemes (MCS) and number of spatial streams for transmitting data to devices via a MU-MIMO transmission based on the total number of spatial streams. In one implementation, a wireless node selects first MCS, first number of spatial stream(s) for a first device, and total number of spatial streams to be used in the MU-MIMO transmission so as to maximize the data rate to the first device, then selects a second MCS and a second number of spatial stream(s) for a second device based on the selected total number of spatial streams. In another implementation, the wireless node toggles the first selection of the MCS and spatial stream(s) between the first and second devices for fairness purposes. In another implementation, a wireless selects the MCS and the spatial streams for the receiving nodes so as to maximize the aggregate data rate for the MU-MIMO transmission.

22 Claims, 14 Drawing Sheets

(56) References Cited

U.S. PATENT DOCUMENTS

| | | |
|---|---|---|
| 2012/0155415 A1 | 6/2012 | Seok |
| 2012/0155447 A1 | 6/2012 | Vermani et al. |
| 2013/0100994 A1* | 4/2013 | Merlin .................. H04L 1/0003 375/219 |
| 2014/0071838 A1* | 3/2014 | Jia ........................... H04B 7/04 370/252 |
| 2015/0063111 A1 | 3/2015 | Merlin et al. |

OTHER PUBLICATIONS

Rico-Alvarino A., et al., "Learning-Based Adaptive Transmission for Limited Feedback Multiuser MIMO-OFDM," IEEE Transactions on Wireless Communications, Jul. 2014, vol. 13, No. 7, pp. 3806-3820.
International Search Report and Written Opinion—PCT/US2017/023247—ISA/EPO—Jun. 13, 2017.

* cited by examiner

FOR COMMUNICATING WITH STA-A ($Nss_A = 1$)

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | $PER_A(1,1,1)$ | $RATE_A(1,1,1)$ | $PER_A(1,2,1)$ | $RATE_A(1,2,1)$ | $PER_A(1,3,1)$ | $RATE_A(1,3,1)$ |
| ⋮ | ⋮ | ⋮ | ⋮ | ⋮ | ⋮ | ⋮ |
| MCS-9 | $PER_A(9,1,1)$ | $RATE_A(9,1,1)$ | $PER_A(9,2,1)$ | $RATE_A(9,2,1)$ | $PER_A(9,3,1)$ | $RATE_A(9,3,1)$ |

FIG. 4A

FOR COMMUNICATING WITH STA-A ($Nss_A = 2$)

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | $PER_A(1,1,2)$ | $RATE_A(1,1,2)$ | $PER_A(1,2,2)$ | $RATE_A(1,2,2)$ | N/A | N/A |
| ⋮ | ⋮ | ⋮ | ⋮ | ⋮ | ⋮ | ⋮ |
| MCS-9 | $PER_A(9,1,2)$ | $RATE_A(9,1,2)$ | $PER_A(9,2,2)$ | $RATE_A(9,2,2)$ | N/A | N/A |

FIG. 4B

FOR COMMUNICATING WITH STA-A (Nss$_A$ = 1) (Nss_tot=1(SU), 2(MU-2) AND 3(MU-3))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_A$(1,1,1,1) | RATE$_A$(1,1,1,1) | PER$_A$(1,2,1,2) | RATE$_A$(1,2,1,2) | PER$_A$(1,3,1,3) | RATE$_A$(1,3,1,3) |
| ⋮ | ⋮ | ⋮ | ⋮ | ⋮ | ⋮ | ⋮ |
| MCS-9 | PER$_A$(9,1,1,1) | RATE$_A$(9,1,1,1) | PER$_A$(9,2,1,2) | RATE$_A$(9,2,1,2) | PER$_A$(9,3,1,3) | RATE$_A$(9,3,1,3) |

FIG. 7A

FOR COMMUNICATING WITH STA-A (Nss$_A$ = 2) (Nss_tot=2(SU) AND 3(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_A$(1,1,2,2) | RATE$_A$(1,1,2,2) | PER$_A$(1,2,2,3) | RATE$_A$(1,2,2,3) | N/A | N/A |
| ⋮ | ⋮ | ⋮ | ⋮ | ⋮ | ⋮ | ⋮ |
| MCS-9 | PER$_A$(9,1,2,2) | RATE$_A$(9,1,2,2) | PER$_A$(9,2,2,3) | RATE$_A$(9,2,2,3) | N/A | N/A |

FIG. 7B

FOR COMMUNICATING WITH STA-A (Nss$_A$ = 1) (Nss_tot=1(SU) AND 3(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_A$(1,1,1,1) | RATE$_A$(1,1,1,1) | PER$_A$(1,2,1,3) | RATE$_A$(1,2,1,3) | N/A | N/A |
| • | • | • | • | • | • | • |
| • | • | • | • | • | • | • |
| • | • | • | • | • | • | • |
| MCS-9 | PER$_A$(9,1,1,1) | RATE$_A$(9,1,1,1) | PER$_A$(9,2,1,3) | RATE$_A$(9,2,1,3) | N/A | N/A |

FIG. 7C

FOR COMMUNICATING WITH STA-A (Nss$_A$ = 2) (Nss_tot=2(SU) AND 4(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_A$(1,1,2,2) | RATE$_A$(1,1,2,2) | PER$_A$(1,2,2,4) | RATE$_A$(1,2,2,4) | N/A | N/A |
| • | • | • | • | • | • | • |
| • | • | • | • | • | • | • |
| • | • | • | • | • | • | • |
| MCS-9 | PER$_A$(9,1,2,2) | RATE$_A$(9,1,2,2) | PER$_A$(9,2,2,4) | RATE$_A$(9,2,2,4) | N/A | N/A |

FIG. 7D

FOR COMMUNICATING WITH STA-B (Nss$_B$ = 1) (Nss_tot=1(SU), 2(MU-2) AND 3(MU-3))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_B$(1,1,1,1) | RATE$_B$(1,1,1,1) | PER$_B$(1,2,1,2) | RATE$_B$(1,2,1,2) | PER$_B$(1,3,1,3) | RATE$_B$(1,3,1,3) |
| ⋮ | ⋮ | ⋮ | ⋮ | ⋮ | ⋮ | ⋮ |
| MCS-9 | PER$_B$(9,1,1,1) | RATE$_B$(9,1,1,1) | PER$_B$(9,2,1,2) | RATE$_B$(9,2,1,2) | PER$_B$(9,3,1,3) | RATE$_B$(9,3,1,3) |

FIG. 8A

FOR COMMUNICATING WITH STA-B (Nss$_B$ = 2) (Nss_tot=2(SU) AND 3(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | PER$_B$(1,1,2,2) | RATE$_B$(1,1,2,2) | PER$_B$(1,2,2,3) | RATE$_B$(1,2,2,3) | N/A | N/A |
| ⋮ | ⋮ | ⋮ | ⋮ | ⋮ | ⋮ | ⋮ |
| MCS-9 | PER$_B$(9,1,2,2) | RATE$_B$(9,1,2,2) | PER$_B$(9,2,2,3) | RATE$_B$(9,2,2,3) | N/A | N/A |

FIG. 8B

FOR COMMUNICATING WITH STA-B ($Nss_B$ = 1) ($Nss\_tot$=1(SU) AND 3(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | $PER_B(1,1,1,1)$ | $RATE_B(1,1,1,1)$ | $PER_B(1,2,1,3)$ | $RATE_B(1,2,1,3)$ | N/A | N/A |
| ⋮ | ⋮ | ⋮ | ⋮ | ⋮ | ⋮ | ⋮ |
| MCS-9 | $PER_B(9,1,1,1)$ | $RATE_B(9,1,1,1)$ | $PER_B(9,2,1,3)$ | $RATE_B(9,2,1,3)$ | N/A | N/A |

FIG. 8C

FOR COMMUNICATING WITH STA-B ($Nss_B$ = 2) ($Nss\_tot$=2(SU) AND 4(MU-2))

| MCS | ESTIMATED SU PER | ESTIMATED SU GOODPUT | ESTIMATED MU-2 PER | ESTIMATED MU-2 GOODPUT | ESTIMATED MU-3 PER | ESTIMATED MU-3 GOODPUT |
|---|---|---|---|---|---|---|
| MCS-1 | $PER_B(1,1,2,2)$ | $RATE_B(1,1,2,2)$ | $PER_B(1,2,2,4)$ | $RATE_B(1,2,2,4)$ | N/A | N/A |
| ⋮ | ⋮ | ⋮ | ⋮ | ⋮ | ⋮ | ⋮ |
| MCS-9 | $PER_B(9,1,2,2)$ | $RATE_B(9,1,2,2)$ | $PER_B(9,2,2,4)$ | $RATE_B(9,2,2,4)$ | N/A | N/A |

FIG. 8D

SYSTEM AND METHOD FOR RATE ADAPTATION BASED ON TOTAL NUMBER OF SPATIAL STREAMS IN MU-MIMO TRANSMISSIONS

FIELD

Certain aspects of the present disclosure generally relate to wireless communications and, more particularly, to a system and method for rate adaptation (e.g., selecting the modulation coding scheme (MCS) and number of spatial stream Nss for each receiving device) based on total number of spatial streams in multi-user multiple-input-multiple-output (MU-MIMO) transmissions.

BACKGROUND

A transmitting wireless node, such as an access point or a user device, having multi-user multiple-input-multiple-output (MU-MIMO) transmission capability is able to simultaneously transmit data (e.g., data frame) to multiple receiving wireless nodes via a set of spatial streams. In such MU-MIMO transmission, there may be one or more spatial streams for transmitting data to each of the receiving wireless nodes.

The transmitting wireless node performs rate adaptation by selecting a particular modulation coding scheme (MCS) and a particular number of spatial streams (Nss) used for transmitting data to each of the receiving wireless nodes via a MU-MIMO transmission. Typically, the selection of the particular MCS for a receiving wireless node is from among a set of available MCSs (e.g., MCS-1 to MCS-9). Similarly, the selection of the particular number of spatial streams for a receiving wireless node is from among a set of available numbers of spatial streams (e.g., Nss=1, 2, 3, or 4 (or other number of available spatial streams)).

Typically, the transmitting wireless node selects an MCS-Nss combination for transmitting data to a receiving wireless node based on the maximum expected data rates associated with the available set of MCSs and statistically-determined expected data error rates associated with the available MCS-Nss combinations, respectively. The transmitting wireless node typically selects a particular MCS-Nss combination in order to maximize the effective data rate (e.g., goodput) for transmitting data to each receiving wireless node via the MU-MIMO transmission. Accordingly, the disclosure herein relates to improvements in selecting the MCS-Nss combination for each receiving wireless node of an MU-MIMO transmission.

SUMMARY

Certain aspects of the present disclosure provide an apparatus for wireless communications. The apparatus includes a processing system configured to determine a first modulation coding scheme (MCS) for transmitting data to a first wireless node via a multiple-user multiple-input-multiple-output (MU-MIMO) transmission based on a total number of spatial streams to be used in the MU-MIMO transmission; and generate a first frame for transmission to the first wireless node, wherein the first frame includes a first data payload modulated and coded using the first MCS; and an interface configured to output the first frame for transmission to the first wireless node via the MU-MIMO transmission.

Certain aspects of the present disclosure provide a method for wireless communications. The method includes determining a first modulation coding scheme (MCS) for transmitting data to a first wireless node via a multiple-user multiple-input-multiple-output (MU-MIMO) transmission based on a total number of spatial streams to be used in the MU-MIMO transmission; generating a first frame for transmission to the first wireless node, wherein the first frame includes a first data payload modulated and coded using the first MCS; and outputting the first frame for transmission to the first wireless node via the MU-MIMO transmission.

Certain aspects of the present disclosure provide an apparatus for wireless communications. The apparatus includes means for determining a first modulation coding scheme (MCS) for transmitting data to a first wireless node via a multiple-user multiple-input-multiple-output (MU-MIMO) transmission based on a total number of spatial streams to be used in the MU-MIMO transmission; means for generating a first frame for transmission to the first wireless node, wherein the first frame includes a first data payload modulated and coded using the first MCS; and means for outputting the first frame for transmission to the first wireless node via the MU-MIMO transmission.

Certain aspects of the present disclosure provide a computer readable medium having instructions stored thereon for determining a first modulation coding scheme (MCS) for transmitting data to a first device via a multiple-user multiple-input-multiple-output (MU-MIMO) transmission based on a total number of spatial streams used in the MU-MIMO transmission; generating a first frame for transmission to a first device, wherein the first frame includes a first data payload modulated and coded using the first MCS; and outputting the first frame for transmission to the first device via the MU-MIMO transmission.

Aspects of the present disclosure also provide various methods, means, and computer program products corresponding to the apparatuses and operations described above.

BRIEF DESCRIPTION OF THE DRAWINGS

FIGS. 4A-4B illustrate a pair of tables or sets of information that a first wireless node may consult in selecting a particular modulation coding scheme (MCS) and a number of spatial streams (Nss) for transmitting data to a second wireless node via an MU-MIMO transmission in accordance with certain aspects of the present disclosure.

FIGS. 7A-7D illustrate exemplary tables or sets of information that a first wireless node may consult in selecting an MCS and Nss for transmitting data to a second wireless node via an MU-MIMO transmission in accordance with certain aspects of the present disclosure.

FIGS. 8A-8D illustrate exemplary tables of information that the first wireless node may consult in selecting an MCS and Nss for transmitting data to a third wireless node via an MU-MIMO transmission in accordance with certain aspects of the present disclosure.

DETAILED DESCRIPTION

Figure 1:
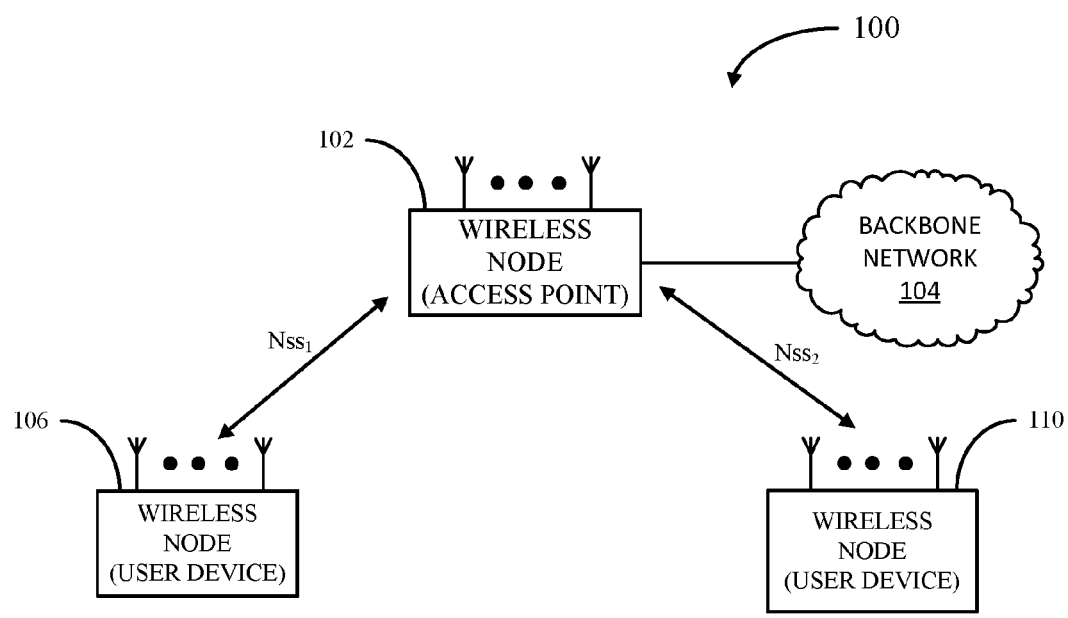
FIG. 1 illustrates a block diagram of an exemplary wireless communications system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communications System

The techniques described herein may be used for various broadband wireless communications systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP"), generally a wireless node, may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT"), generally a wireless node, may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates a block diagram of an exemplary wireless communications system 100. The communications system 100 comprises an access point 102 (generally a wireless node), a backbone network 104, a user device 106 (generally a wireless node), and another user device 110 (generally a wireless node).

The access point 102, which may be configured for wireless local area network (LAN) and/or wireless wide area network (WAN) applications, may facilitate data communications between the user devices 106 and 110. The access point 102 may further facilitate data communications between devices (not shown) coupled to the backbone network 104 and any one or more of the user devices 106 and 110.

As discussed in more detail herein, the access point 102 may simultaneously transmit data to the user devices 106 and 110 via a multi-user multiple-input-multiple-output (MU-MIMO) transmission. In accordance with the MU-MIMO transmission, the access point 102 transmits data to the user device 106 via a number of one or more spatial streams $Nss_1$. Similarly, the access point 102 transmits data to the user device 110 via a number of one or more spatial streams $Nss_2$.

Figure 2:
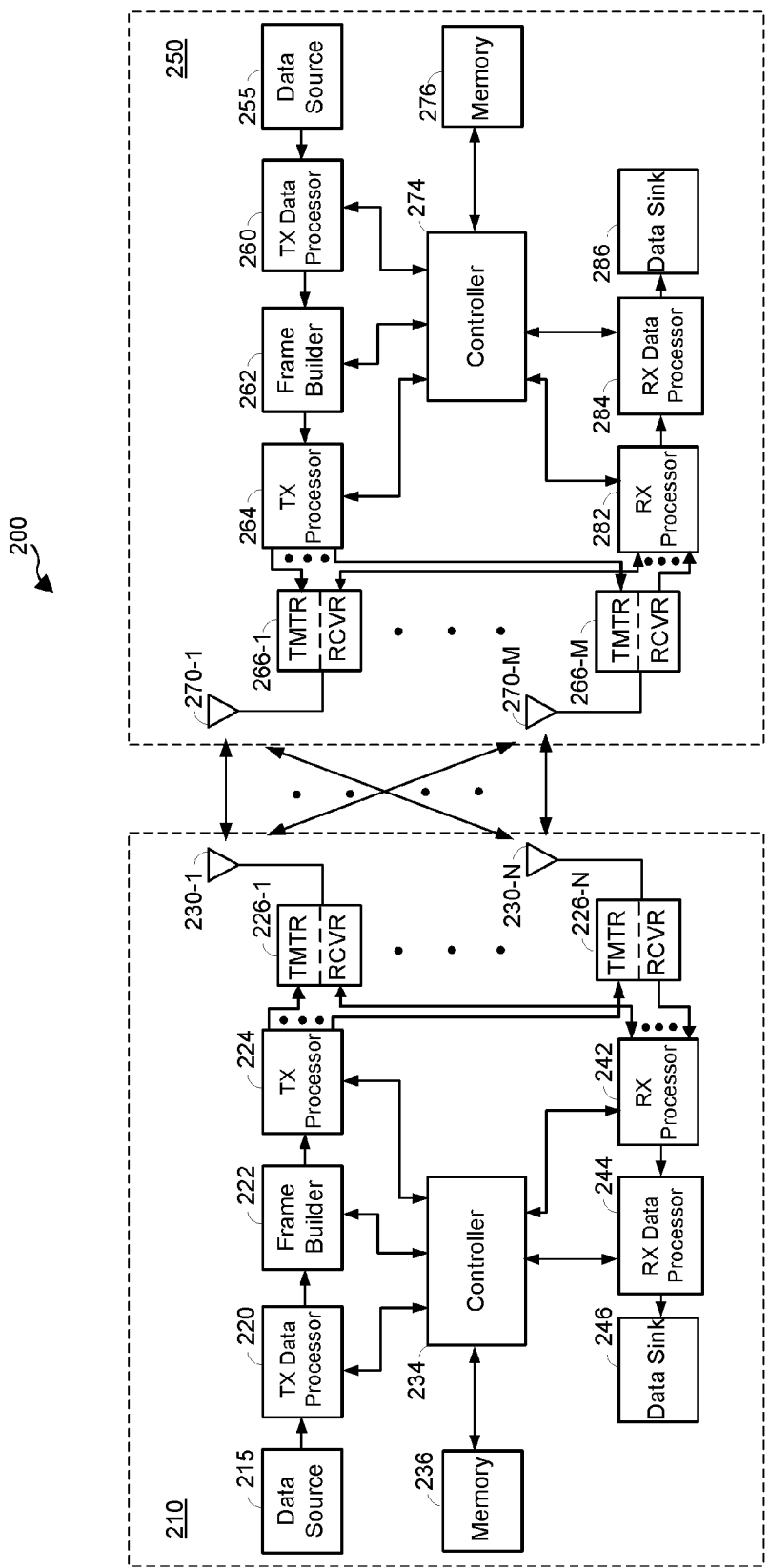
FIG. 2 illustrates a block diagram of an access point (generally, a first wireless node) and a user device (generally, a second wireless node) in accordance with certain aspects of the present disclosure.

FIG. 2 illustrates a block diagram of a wireless communications system 200 including an access point 210 (generally, a first wireless node) and a user device 250 (generally, a second wireless node). The access point 210 is a transmitting entity for the downlink and a receiving entity for the uplink. The user device 250 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

For transmitting data, the access point 210 comprises a transmit data processor 220, a frame builder 222, a transmit processor 224, a plurality of transceivers 226-1 to 226-N, and a plurality of antennas 230-1 to 230-N. The access point 210 also comprises a controller 234 for controlling operations of the access point 210.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16 QAM, 64 QAM, 64 APSK, 128 APSK, 256 QAM, and 256 APSK.

In certain aspects, the controller 234 may send a command to the transmit data processor 220 specifying which modulation and coding scheme (MCS) to use (e.g., based on channel conditions of the downlink as measured by an expected data error rate and/or expected data transmission rate), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a payload data of the frame. The frame may include a preamble with specific sequences for automatic gain control (AGC) at the transmitter and/or receiver, timing and phase adjustment at the receiver for properly decoding the frame, and channel estimation and equalization at the receiver. Additionally, the frame may include a header that provides information pertaining to the frame (e.g., the specific MCS for the data payload, number of spatial streams, etc.). The frame builder 222 outputs the frame to the transmit processor 224.

The transmit processor 224 processes the frame for transmission on the downlink. For example, the transmit processor 224 may support different transmission modes, such as orthogonal frequency-division multiplexing (OFDM) transmission mode, single-carrier (SC) transmission mode, wideband single carrier (WB SC) transmission mode, aggregate single carrier (SC) transmission mode, etc. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission, including single-user MIMO (also known as SU-MIMO) and multi-user MIMO (also known as MU-MIMO). In these aspects, the access point 210 may include multiple antennas 230-1 to 230-N and multiple transceivers 226-1 to 226-N (e.g., one for each antenna). The transmit processor 224 may perform spatial processing on the incoming frame and provide a plurality of transmit streams for the plurality of antennas. In this example, the controller 234 may send a command to the transmit processor 224 specifying the number of one or more spatial streams for transmitting data to each receiving device of an MU-MIMO transmission (e.g., based on channel conditions of the downlink as measured by an expected data error rate and/or expected data transmission rate).

The transceivers 226-1 to 226-N receive and processes (e.g., converts to analog, amplifies, filters, and frequency up-converts) the respective transmit frame streams to generate distinct spatially-diverse transmit signals for transmission via the antennas 230-1 to 230-N, respectively. For example, the transceivers 226-1 to 226-M may up-convert the output of the transmit processor 224 to a transmit signal having a frequency in the 60 GHz range.

For transmitting data, the user device 250 comprises a transmit data processor 260, a frame builder 262, a transmit processor 264, a plurality of transceivers 266-1 to 266-M, and a plurality of antennas 270-1 to 270-M (e.g., one antenna per transceiver). The user device 250 may transmit data to the access point 210 on the uplink, and/or transmit data to another user device (e.g., for peer-to-peer communication). The user device 250 also comprises a controller 274 for controlling operations of the user device 250.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16 QAM, 64 QAM, 64 APSK, 128 APSK, 256 QAM, and 256 APSK. In certain aspects, the controller 274 may send a command to the transmit data processor 260 specifying which MCS to use (e.g., based on channel conditions of the uplink as measured by an expected data error rate and/or expected data transmission rate), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a payload data of the frame. The frame may include a preamble with specific sequences for automatic gain control (AGC) at the transmitter and/or receiver, timing and phase adjustment at the receiver for properly decoding the frame, and channel estimation and equalization at the receiver. Additionally, the frame may include a header that provides information pertaining to the frame (e.g., the specific MCS for the data payload, number of spatial streams, etc.). The frame builder 262 outputs the frame to the transmit processor 264.

The transmit processor 264 processes the frame for transmission. For example, the transmit processor 264 may support different transmission modes such as an OFDM transmission mode, SC transmission mode, WB SC transmission mode, aggregate SC transmission mode, etc. In this example, the controller 274 may send a command to the transmit processor 264 specifying which transmission mode to use, and the transmit processor 264 may process the frame for transmission according to the specified transmission mode.

In certain aspects, the transmit processor 264 may support MIMO transmission, including SU-MIMO and MU-MIMO transmissions. In these aspects, the user device 250 may include multiple antennas 270-1 to 270-M and multiple transceivers 266-1 to 266-M (e.g., one for each antenna). The transmit processor 264 may perform spatial processing on the incoming frame and provide a plurality of transmit frame streams for the plurality of antennas 270-1 to 270-M. The transceivers 266-1 to 266-M receive and process (e.g., converts to analog, amplifies, filters, and frequency up-converts) the respective transmit frame streams to generate distinct spatially-diverse transmit signals for transmission via the antennas 270-1 to 270-M. In this example, the controller 274 may send a command to the transmit processor 264 specifying the number of one or more spatial streams for transmitting data to each receiving device of an MU-MIMO transmission (e.g., based on channel conditions of the uplink as measured by an expected data error rate and/or expected data transmission rate).

The transceivers 266-1 to 266-M receive and processes (e.g., converts to analog, amplifies, filters, and frequency up-converts) the output of the transmit processor 264 for transmission via the one or more antennas 270-1 to 270-M. For example, the transceivers 266-1 to 266-M may up-convert the output of the transmit processor 264 to a transmit signal having a frequency in the 60 GHz range.

For receiving data, the access point 210 comprises a receive processor 242, and a receive data processor 244. In operation, the transceivers 226-1 to 226-N receive a signal (e.g., from the user device 250), and spatially process (e.g., frequency down-converts, amplifies, filters and converts to digital) the received signal.

The receive processor 242 receives the outputs of the transceivers 226-1 to 226-N, and processes the outputs to recover data symbols. For example, the access point 210 may receive data (e.g., from the user device 250) in a frame. In this example, the receive processor 242 may detect the start of the frame using a preamble sequence of the frame. Using the preamble sequence, the receiver processor 242 may perform automatic gain control (AGC), timing, and phase adjustments. The receive processor 242 may also perform channel estimation and channel equalization on the received signal based on the channel estimation.

Further, the receiver processor 242 may estimate phase noise using a guard intervals (GIs) in the payload, and reduce the phase noise in the received signal based on the estimated phase noise. The phase noise may be due to noise from a local oscillator in the user device 250 and/or noise from a local oscillator in the access point 210 used for frequency conversion. The phase noise may also include noise from the channel. The receive processor 242 may also recover information (e.g., MCS scheme and number of spatial stream(s)) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

Also, as discussed above, the transmit processor 264 may support multiple-output-multiple-input (MIMO) transmission, including SU-MIMO and MU-MIMO. In this case, the access point 210 includes multiple antennas 230-1 to 230-N and multiple transceivers 226-1 to 226-N (e.g., one for each antenna). Each transceiver receives and processes (e.g., frequency down-converts, amplifies, filters, converts to digital) the signal from the respective antenna. The receive processor 242 may perform spatial processing on the outputs of the transceivers 226-1 to 226-N to recover the data symbols. The controller 234 may provide an indication of the number of spatial streams to the receive processor 242 for performing the spatial processing of the received signal.

For receiving data, the user device 250 comprises a receive processor 282, and a receive data processor 284. In operation, the transceivers 266-1 to 266-M receive a signal (e.g., from the access point 210 or another user device) via the respective antennas 270-1 to 270-M, and process (e.g., frequency down-converts, amplifies, filters and converts to digital) the received signal.

The receive processor 282 receives the outputs of the transceivers 266-1 to 266-M, and processes the outputs to recover data symbols. For example, the user device 250 may receive data (e.g., from the access point 210 or another user device) in a frame, as discussed above. In this example, the receive processor 282 may detect the start of the frame using the preamble of the frame. Using the preamble sequence, the receive processor 282 may perform automatic gain control (AGC), timing, and phase adjustments. The receive processor 282 may also perform channel estimation and channel equalization on the received signal based on the channel estimation.

Further, the receive processor 282 may estimate phase noise using the guard intervals (GIs) in the payload, and reduce the phase noise in the received signal based on the estimated phase noise. The receive processor 282 may also recover information (e.g., MCS scheme, number of spatial streams, etc.) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

Also, as discussed above, the transmit processor 224 may support multiple-output-multiple-input (MIMO) transmission, including SU-MIMO and MU-MIMO. In this case, the user device 250 may include multiple antennas and multiple transceivers (e.g., one for each antenna). Each transceiver receives and processes (e.g., frequency down-converts, amplifies, filters, convert to digital) the signal from the respective antennas. The receive processor 282 may perform spatial processing on the outputs of the transceivers to recover the data symbols. The controller 274 may provide an indication of the number of spatial streams to the receive processor 282 for performing the spatial processing of the received signal.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the user device 250 also comprises a memory 276 coupled to the controller 274. The memory 276 may store instructions that, when executed by the controller 274, cause the controller 274 to perform the one or more of the operations described herein.

Figure 3A:
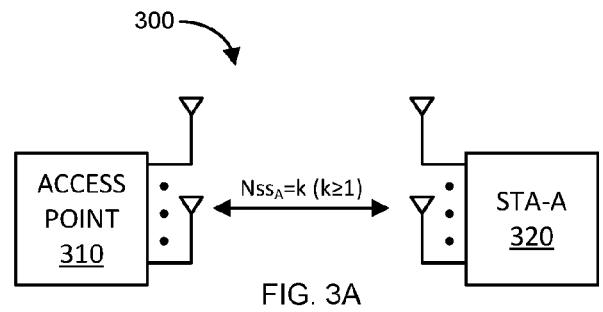
FIG. 3A illustrates an exemplary wireless communications system for performing a single-user multiple-input-multiple-output (SU-MIMO) transmission in accordance with certain aspects of the present disclosure.

FIG. 3A illustrates a block diagram of an exemplary communications system 300 including an access point 310 and a user device STA-A 320. As the access point 310 has SU-MIMO capability, the access point 310 may perform an SU-MIMO transmission of data (e.g., one or more data frames) to STA-A 320 via one or more spatial streams $Nss_A$, where integer k represents the number of spatial stream(s).

Figure 3B:
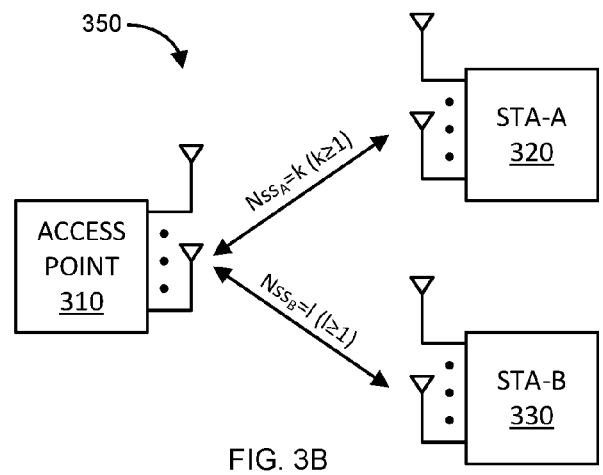
FIG. 3B illustrates an exemplary wireless communications system for performing a multi-user multiple-input-multiple-output (MU-MIMO) transmission involving two receiving wireless nodes in accordance with certain aspects of the present disclosure.

FIG. 3B illustrates a block diagram of another exemplary communication system 350 including the access point 310 and the user device STA-A 320, and another user device STA-B 330 in accordance with certain aspects of the disclosure. Similarly, as the access point 310 has MU-MIMO capability, the access point 310 may perform an MU-MIMO (simultaneous) transmission of a set of one or more data frames f to STA-A 320 via one or more spatial streams $Nss_A$ and STA-B 330 via one or more spatial streams $Nss_B$, respectively; where integer l represents the number of spatial stream(s) for STA-B 330. As an example, the access point 310 may limit each integer k or l to a certain number (e.g., no more than two (2)) when there are two stations communicating with the access point. It shall be understood that this limitation may be implementation specific, and other implementations that incorporate the concepts described herein need not have such limitation.

Figure 3C:
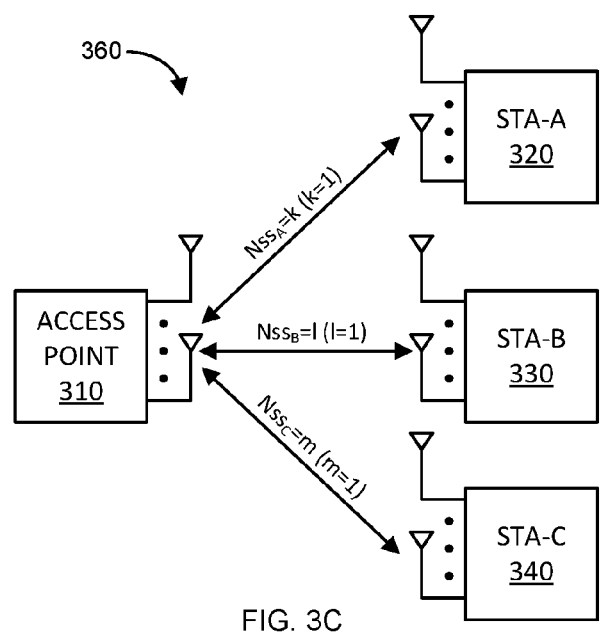
FIG. 3C illustrates an exemplary wireless communications system for performing a MU-MIMO transmission involving three receiving wireless nodes in accordance with certain aspects of the present disclosure.

FIG. 3C illustrates a block diagram of yet another exemplary communication system 360 including the access point 310 and the user devices STA-A 320 and STA-B 330, and yet another user device STA-C 340. Similarly, as the access point 310 has MU-MIMO capability, the access point 310 may perform an MU-MIMO (simultaneous) transmission of a set of one or more data frames to STA-A 320 via one or more spatial streams $Nss_A$, STA-B 330 via one or more spatial streams $Nss_B$, and STA-C 340 via one or more spatial streams $Nss_C$, respectively; where the integer m represents the number of spatial stream(s) for STA-C 340. In this example, the access point 310 may limit each integer k, l, or m to a certain number (e.g., no more than one (1)) when there are three stations communicating with the access point. It shall be understood that this limitation may be implementation specific, and other implementations that incorporate the concepts described herein need not have such limitation.

Although in the examples provided herein, the number of receiving wireless nodes per a MU-MIMO transmission is two (2) or three (3), it shall be understood that the number of receiving wireless nodes may be more than two (2) or three (3). Similarly, although in the examples provided herein, the number of spatial streams for each receiving wireless node is one (1) or two (2), it shall be understood that the number of spatial streams for each receiving wireless node may be more than one (1) or two (2).

In wireless communications system 300, the access point 310 determines a modulation coding scheme ($MCS_A$) and the number k of spatial stream(s) $Nss_A$ for transmitting data to STA-A 320 so as to maximize the data rate (e.g., the goodput or the application-level data rate). In this case, the access point 310 selects $MCS_A$ and $Nss_A$ based on a determined estimated data error rate (e.g., a packet error rate (PER)) for a SU-MIMO transmission since the access point 310 is only communicating with a single user.

Similarly, in wireless communications system 350, the access point 310 determines the $MCS_A$ and $Nss_A$ for transmitting data to STA-A 320 so as to maximize the goodput for STA-A 320, and determines the $MCS_B$ and $Nss_B$ for transmitting data to STA-B 330 so as to maximize the goodput for STA-B 330. In this case, the access point 310 selects $MCS_A$ and $Nss_A$ based on a determined estimated PER associated with STA-A 320 for a two-user MU-MIMO transmission (MU-2) since the access point 310 is transmitting to two user devices. Similarly, the access point 310 selects $MCS_B$ and $Nss_B$ based on a determined estimated PER associated with STA-B 330 for a two-user MU-MIMO transmission (MU-2).

In a like manner, in wireless communications system 360, the access point 310 determines the $MCS_A$ and $Nss_A$ for transmitting data to STA-A 320 so as to maximize the goodput for STA-A 320, determines the $MCS_B$ and $Nss_B$ for transmitting data to STA-B 330 so as to maximize the goodput for STA-B 330, and determines the $MCS_C$ and $Nss_C$ for transmitting data to STA-C 340 so as to maximize the goodput for STA-C 340. In this case, the access point 310 selects $MCS_A$ and $Nss_A$ based on a determined estimated PER associated with STA-A 320 for a three-user MU-MIMO transmission (MU-3) since the access point 310 is communicating with three user devices. Similarly, the access point 310 selects $MCS_B$ and $Nss_B$ based on a determined estimated PER associated with STA-B 330 for the three-user MU-MIMO transmission (MU-3). And, in a like manner, the access point 310 selects $MCS_C$ and $Nss_C$ based on a determined estimated PER associated with STA-C 340 for the three-user MU-MIMO transmission (MU-3).

FIGS. 4A-4B illustrate a pair of tables or sets of information that the access point 310 may consult in selecting the $MCS_A$ and $Nss_A$ for STA-A 320. The access point 310 may consult similar pairs of tables or sets of information for each of STA-B 330 and STA-340 for selecting $MCS_B$ and $Nss_B$ and $MCS_C$ and $Nss_C$, respectively.

Table 4A pertains to the case where the access point 310 is transmitting data to STA-A 320 using a single spatial stream. The left-column represents the available MCSs for communicating with STA-A 320. In this example, there are 9 available MCSs (MCS-1 to MCS-9). It shall be understood that 9 is an example, and the number of available MCSs may be more or less than 9.

The second and third columns (from the left) indicate the estimated PERs and goodputs for the corresponding MCS-1 to MCS-9 for the case where the access point 310 is transmitting data to STA-A 320 via an SU-MIMO transmission. For example, $PER_A(1,1,1)$ is the estimated PER for transmitting data to STA-A using MCS-1, where the first number in the parenthesis represents the MCS index (1 in this case), the second number represents the number of devices receiving data pursuant to the transmission (for SU-MIMO, it is one (1)), and the third number represents the number of spatial stream $Nss_A$ used to transmit data to STA-A 320 (it is one (1) in this case as TABLE 4A pertains to only the case where $Nss_A$=1). The $RATE_A(1,1,1)$ is the estimated goodput corresponding to MCS-1 and $PER_A(1,1,1)$. The estimated goodput $RATE_A(1,1,1)$ may be determined as follows:

$$RATE_A(1,1,1)=MAX\_RATE(1,1,1)*(1-PER_A(1,1,1))$$

where MAX_RATE(1,1,1) is the goodput that can be achieved if the $PER_A(1,1,1)$ is equal to zero (0). Similarly, $PER_A(9,1,1)$ and $RATE_A(9,1,1)$ pertains to the case of MCS-9 for SU-MIMO and $Nss_A$=1.

The fourth and fifth columns (from the left) indicate the estimated PERs and goodputs for the corresponding MCS-1 to MCS-9 for the case where the access point 310 is transmitting data to STA-A 320 via a two-user MU-MIMO (MU-2) transmission. Similarly, the sixth and seventh columns (from the left) indicate the estimated PERs and goodputs for the corresponding MCS-1 to MCS-9 for the case where the access point 310 is transmitting data to STA-A 320 via a three-user MU-MIMO (MU-3) transmission.

Table 4B is for the case where the access point 310 is transmitting data to STA-A 320 using two spatial streams ($Nss_A$=2). Table 4B is organized in the same manner as Table 4A, but the entries pertain to the case where two spatial streams are used to transmit data to STA-A 320 (as indicated by the third number in the entry parenthesis). Note, in this example, the access point 310 may not support more than one spatial stream per receiving user device for an MU-3 transmission. However, this may be a specific implementation restriction, which may not apply to other implementations that employ the concepts described herein.

Figure 5:
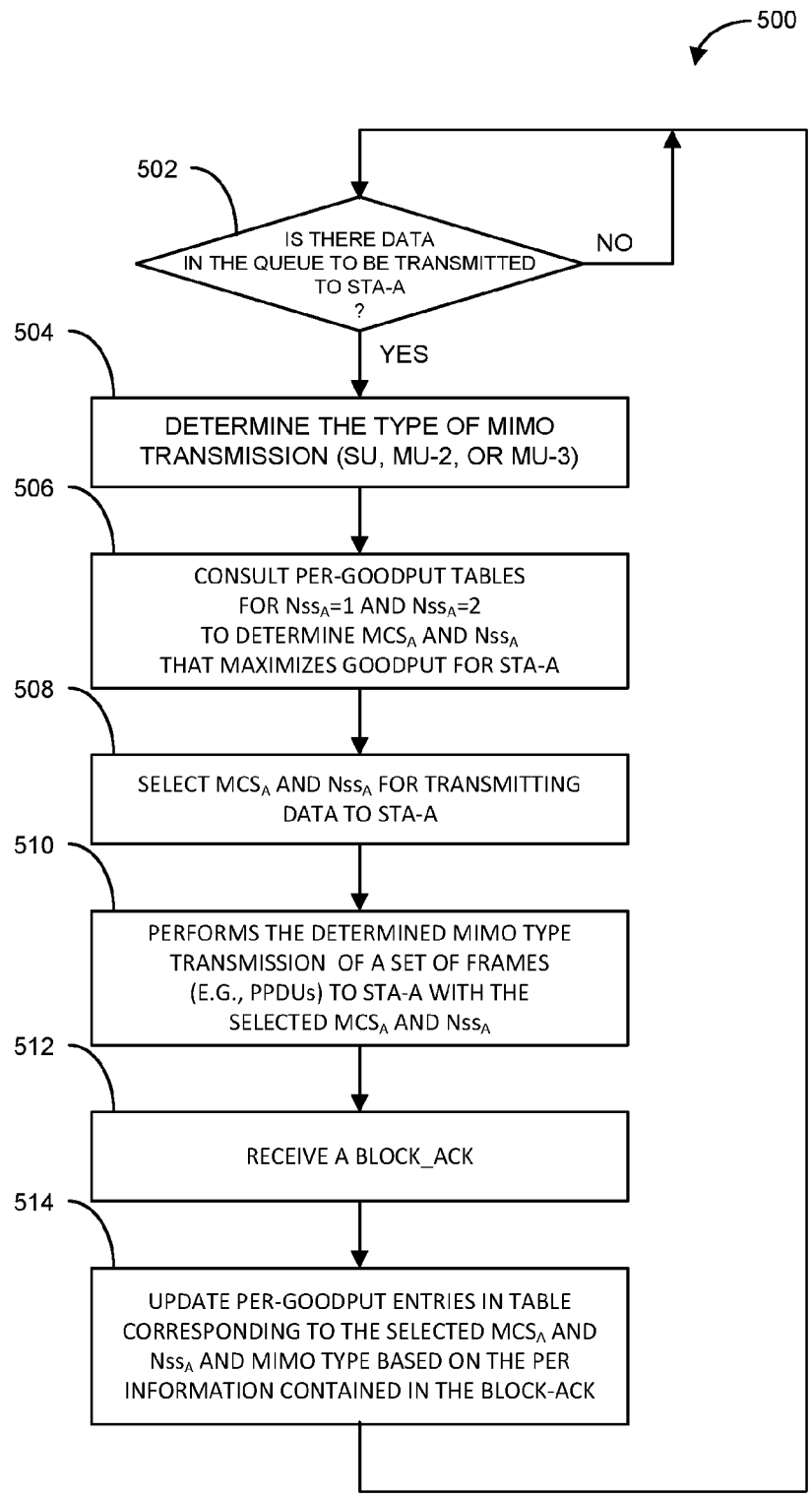
FIG. 5 illustrates a flow diagram of an exemplary method of transmitting data to a wireless node via an MU-MIMO transmission in accordance with certain aspects of the present disclosure.

FIG. 5 illustrates a flow diagram of an exemplary method 500 of transmitting data to STA-A 320. According to the method 500, the access point 310 determines whether there is data in the queue to be transmitted to STA-A 320 (block 502). If no, the access point 310 continues (e.g., periodically or in some other manner) to determine whether there is data in the queue for transmission to STA-A 320.

If, in block 502, the access point 310 determines that there is data in the queue to be transmitted to STA-A 320, the access point then determines the type of MIMO transmission (e.g., SU, MU-2, or MU-3) (block 504). Based on the determined type of MIMO transmission, the access point 310 consults the appropriate entries in Tables 4A-4B to determine the $MCS_A$ and $Nss_A$ that maximizes the goodput for STA-A 320 (block 506).

For example, if the MIMO transmission type is SU, the access point 310 consults the respective second and third columns of Tables 4A-4B to determine which entry ($MCS_A$ and $Nss_A$) provides the maximum goodput. If the MIMO transmission type is MU-2, the access point 310 consults the respective fourth and fifth columns of Tables 4A-4B to determine which entry ($MCS_A$ and $Nss_A$) provides the maximum goodput. If the MIMO transmission type is MU-3, the access point 310 consults the sixth and seventh fifth columns of Table 4A to determine which entry ($MCS_A$ and $Nss_A$=1) provides the maximum goodput (as $Nss_A$=2 (Table 4B) may not be available for MU-3).

After consulting the Tables 4A-4B, the access point 310 selects the $MCS_A$ and $Nss_A$ for transmitting data to STA-A 320 (block 508), and then performs the determined-type of MIMO transmission of a set of data frames (e.g., PPDUs) to STA-A 320 with the selected $MCS_A$ and $Nss_A$ (block 510). The access point 310 then receives a block acknowledgement (Block_Ack) from STA-A 320, which includes information indicating the current PER for the data transmission pursuant to block 510 (block 512). The access point 310 then updates the PER-Goodput entries in Table 4A or 4B corresponding to the selected $MCS_A$ and $Nss_A$ and the MIMO-type transmission based on the current PER indicated in the Block_Ack (block 514). For example, the updated estimated PER may be equal to a first weight (e.g., ⅞) multiplied by the previous estimated PER plus a second weight (e.g., ⅛) multiplied by the current PER.

The access point 310 continues to perform the operations of method 500 as the system environment changes (e.g., between systems 300, 350, and 360), and updates the corresponding PER-Goodput entries based on the current PER information received via Block_Acks.

An issue with the aforementioned method 500 of selecting the MCS and Nss for transmitting data to a corresponding user device is that it does not take into account the total number of spatial streams being transmitted via an MU- MIMO transmission. As previously discussed, it only takes into account the number of receiving devices in the MU-MIMO transmission (e.g., MU-2 and MU-3). However, it has been noted that the PER rate associated with a MU-MIMO transmission for a user device is also affected by the total number of spatial streams in the transmission. This is explained with reference to the following examples.

Figure 6A:
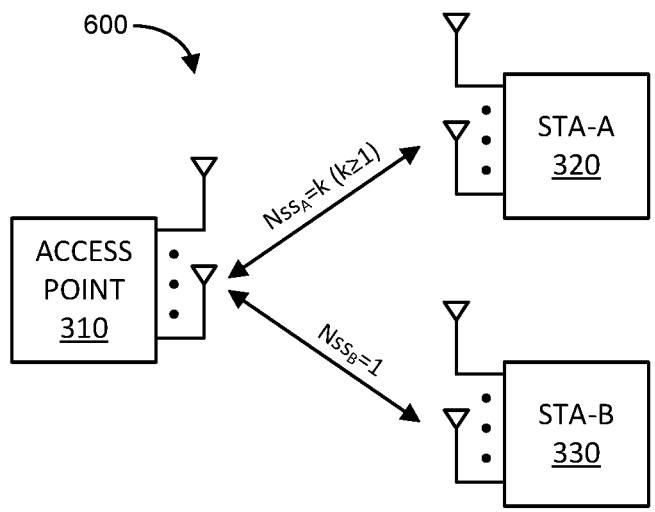
FIG. 6A illustrates a block diagram of an exemplary wireless communications system for performing an MU-MIMO transmission where k spatial stream(s) are used for transmitting data to a first wireless node and a single spatial stream is used for transmitting data to a second wireless node in accordance with certain aspects of the present disclosure.
Figure 6B:
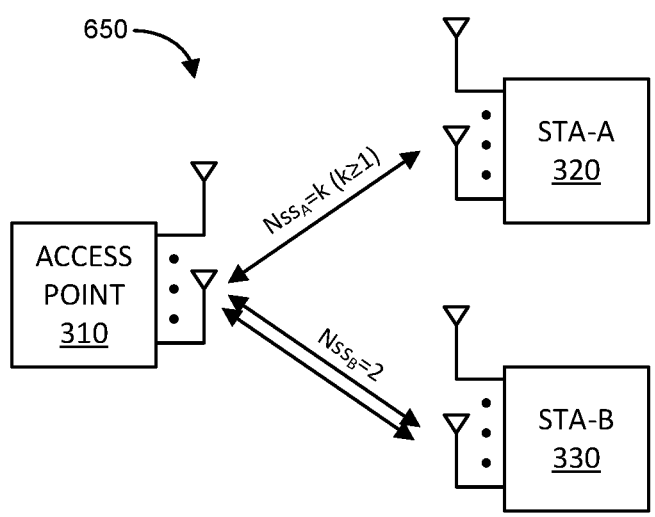
FIG. 6B illustrates a block diagram of an exemplary wireless communications system for performing an MU-MIMO transmission where k spatial stream(s) are used for transmitting data to a first wireless node and two spatial streams are used for transmitting data to a second wireless node in accordance with certain aspects of the present disclosure.

FIG. 6A illustrates a block diagram of an exemplary communications system 600 where the access point 310 has assigned k spatial streams to STA-A 320 and a single spatial stream to STA-B 330. FIG. 6B illustrates a block diagram of a communications system 650 where the access point 310 has assigned k spatial streams to STA-A 320 and two spatial streams for STA-B 330.

In the previous method 500, the access point 310 treats the two systems 600 and 650 the same. That is, in both systems 600 and 650, the access point 310 selects the $MCS_A$ and $Nss_A$ based on two-user MU-MIMO transmission (MU-2), and does not take into account that the total number of spatial streams Nss_tot is 3 in system 600 and the total number of spatial streams Nss_tot is 4 in system 650.

However, the PER for the MU-MIMO transmission for STA-A 320 in system 600 may be different than the PER for the MU-MIMO transmission for STA-320 in system 650. Thus, there is a need to take into account the total number of spatial streams in a MU-MIMO transmission in selecting MCSs and Nss for the user devices involved in MU-MIMO transmissions.

As discussed above, an aspect of the disclosure is to take into account the total number of spatial streams involved in an MU-MIMO transmission in selecting an MCS and Nss for a particular user device. This concept is explained with reference to the following examples.

FIGS. 7A-7D illustrate exemplary tables or sets of information that an access point may consult in selecting an MCS and Nss for transmitting data to a particular station (e.g., STA-A 320) pursuant to an MU-MIMO transmission. The tables 7A-7D are configured similar to tables 4A-4B previously discussed, except tables 7A-7D consider the additional dimension of the total number of spatial streams Nss_tot involved in the MU-MIMO transmission.

For example, Table 7A applies to the case where a single spatial stream is used for transmitting data to STA-A 320 and the number of spatial streams for the transmission is one per each receiving device. The total number of spatial streams Nss_tot is indicated by the fourth number in the parenthesis of each entry. For SU transmission, Nss_tot=1. For MU-2, Nss_tot=2. For MU-3, Nss_tot=3.

Table 7B applies to the case where two spatial streams are used for transmitting data to STA-A 320 and the number of spatial streams for the transmission is one per each of the other receiving devices. Accordingly, for SU transmission, Nss_tot=2. For MU-2, Nss_tot=3. In this example, the access point 110 may not support two spatial streams for STA-A 120 in an MU-3 transmission. However, as previously discussed, this is a specific implementation restriction, and need not apply to other implementations that incorporate the concepts described herein.

Table 7C applies to the case where one spatial stream is used for transmitting data to STA-A 320 and two spatial streams are used for transmitting data to another user, such as STA-B 330. Accordingly, for SU transmission, Nss_tot=1. For MU-2, Nss_tot=3. In this example, the access point 310 may not support two spatial streams for a receiving device in an MU-3 transmission. Again, as previously discussed, this is a specific implementation restriction, and need not apply to other implementations that incorporate the concepts described herein.

Table 7D applies to the case where two spatial streams are used for transmitting data to STA-A 320 and two spatial streams are used for transmitting data to another user, such as STA-B 330. Accordingly, for SU transmission, Nss_tot=2. For MU-2, Nss_tot=4. In this example, the access point 310 may not support an MU-3 transmission. Similarly, as previously discussed, this is a specific implementation restriction, and need not apply to other implementations that incorporate the concepts described herein.

Thus, using these tables 7A-7D, the access point 310 is able to distinguish between the different systems 600 and 650 for selecting the $MCS_A$ and $Nss_A$ for STA-A 320. For example, tables 7A-7B apply to MU-MIMO transmission 600, and tables 7C-7D apply to MU-MIMO transmission 650. By taking into account the total number of spatial streams Nss_tot involved in an MU-MIMO transmission, the measured PERs more accurately reflect the MU-MIMO transmission.

The access point 310 may include a set of tables 7A-7D for each user assigned to the access point. For example, the access point 310 maintains tables 8A-8D for STA-B 330, which is used to exemplify the following methods of transmitting data to STA-A 320 and STA-B 330 considering the total number of spatial streams Nss_tot involved in MU-MIMO transmissions.

Figure 9:
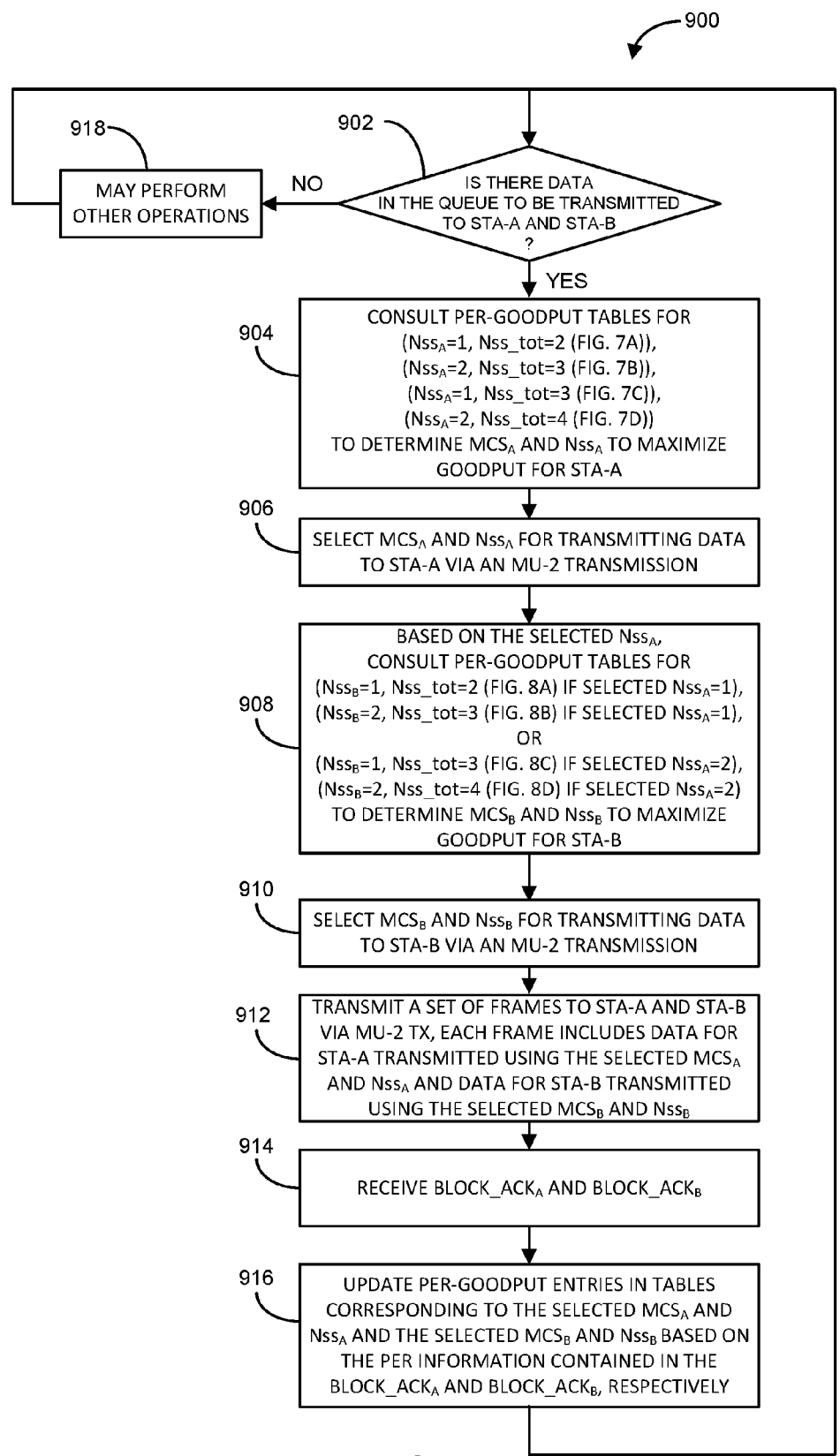
FIG. 9 illustrates a flow diagram of an exemplary method of transmitting data to a pair of wireless nodes via an MU-MIMO transmission in accordance with certain aspects of the present disclosure.

FIG. 9 illustrates a flow diagram of an exemplary method 900 of transmitting data to a pair of user devices via a MU-MIMO transmission according to another aspect of the disclosure. The method 900 may be performed by the access point 310 in transmitting data to STA-A 320 and STA-B 330 via a MU-MIMO transmission. In method 900, the access point 310 favors STA-A 320 as it first selects the $MCS_A$ and $Nss_A$ for maximizing the goodput for STA-A 320, and then selects the $MCS_B$ and $Nss_B$ for maximizing the goodput for STA-B 330 based on the selected $MCS_A$ and $Nss_A$ for STA-A 320.

According to the method 900, the access point 310 determines whether is data in queue for transmission to both STA-A and STA-B (block 902). If the access point 310 determines that there is no data for transmission for both STA-A and STA-B, the access point 310 may perform other operations (block 918) (e.g., send data to only STA-A via an SU transmission if there is data queued for only STA-A, or similarly send data to only STA-B via an SU transmission if there is data queued for only STA-B, or other operations, or return back to block 902).

If, in block 902, the access point 310 determines that there is data queued for both STA-A 320 and STA-B 330, the access point consults the PER-Goodput tables 7A-7D to determine the $MCS_A$ and $Nss_A$ that maximizes the goodput for STA-A 320 (block 904). Based on consulting the tables 7A-7D, the access point 110 selects the $MCS_A$ and $Nss_A$ for transmitting data to STA-A 320 via an MU-2 transmission (block 906).

Then, the access point 310 consults the PER-Goodput tables 8A-8B or 8C-8D to determine the $MCS_B$ and $Nss_B$ that maximizes the goodput for STA-B 330 based on the selected $Nss_A$ for STA-A 320 (block 908). For example, if $Nss_A$=1 is selected, the access point 310 consults Tables 8A and 8B (and not Tables 8C and 8D) to select $MCS_B$ and $Nss_B$. If $Nss_A$=2 is selected, the access point 310 consults Tables 8C and 8D (and not Tables 8A and 8B) to select $MCS_B$ and $Nss_B$. Based on consulting the tables 8A-8B or 8C-8D, the access point 310 selects the $MCS_B$ and $Nss_B$ for transmitting data to STA-B 330 via an MU-2 transmission (block 910).

The access point 310 then simultaneously transmits a set of data frames to STA-A 320 and STA-B 330 via an MU-2 transmission, wherein each of the data frames includes a first data payload for STA-A 320 transmitted using the selected $MCS_A$ and $Nss_A$ and a second data payload for STA-B 330 transmitted using the selected $MCS_B$ and $Nss_B$ (block 912). Then, the access point receives $Block\_ACK_A$ and $Block\_ACK_B$ from STA-A 320 and STA-B 330, respectively (block 914). As previously discussed, the $Block\_ACK_A$ provides information regarding the current PER associated with the first set of data frames to STA-A 320, and the $Block\_ACK_B$ provides information regarding the current PER associated with the second set of data frames to STA-B 330.

Then, the access point 310 updates the PER-Goodput entries corresponding to the selected $MCS_A$ and $Nss_A$ of STA-A 320 based on the current PER information received via the $Block\_ACK_A$, and updates the PER-Goodput entries corresponding to the selected $MCS_B$ and $Nss_B$ of STA-B 330 based on the current PER information received via the $Block\_ACK_B$ (block 916). As previously discussed, the updated PER may be equal to a first weight (e.g., ⅞) multiplied by the previous PER plus a second weight (e.g., ⅛) multiplied by the current PER. The access point 310 then returns to block 902 to repeat the process for next transmittal of data to STA-A 320 and/or STA-B 330.

The method 900 favors STA-A 120 since $MCS_A$ and $Nss_A$ are selected without considering the optimal $MCS_B$ and $NSS_B$ for STA-B 330. The selection of the $MCS_B$ and $NSS_B$ is based on the selected $Nss_A$. The method 900 favoring a particular station may be implemented for many reasons, such as the user of STA-A 320 subscribing for premium services as compared to the services subscribed by the user of STA-B 330. The following describes a method that toggles the favoritism between STA-A 320 and STA-B 330 for fairness or other purposes.

Figure 10:
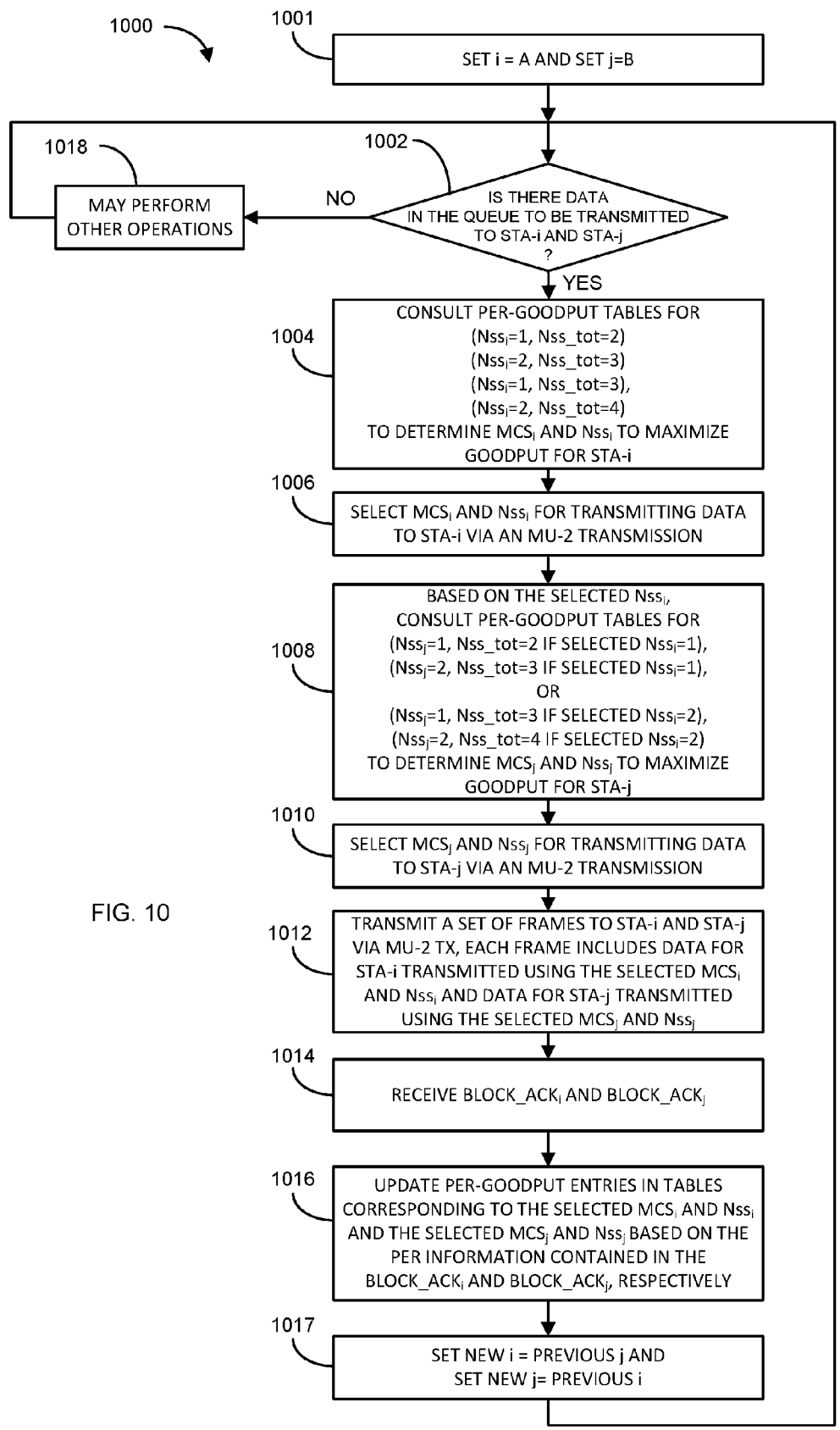
FIG. 10 illustrates a flow diagram of another exemplary method of transmitting data to a pair of wireless nodes via an MU-MIMO transmission in accordance with certain aspects of the present disclosure.

FIG. 10 illustrates a flow diagram of an exemplary method 1000 of transmitting data to a pair of user devices via a MU-MIMO transmission according to another aspect of the disclosure. The method 1000 may be performed by the access point 310 in transmitting data to STA-A 320 and STA-B 330 via a MU-MIMO transmission. In method 1000, the access point 310 toggles the favoritism between STA-A 320 and STA-B 330 in performing a plurality of consecutive MU-2 transmissions to the devices.

According to the method 1000, the access point 310 initially assigns fairness variable i to STA-A 320 and fairness variable j to STA-B (block 1001). Variable i represents the favored station for the current transmission and variable j represents the unfavored station for the current transmission.

The access point 310 determines whether there is data in queue for transmission to both STA-A 320 and STA-B 330 (block 1002). If the access point 310 determines that there no data for transmission for both STA-A 320 and STA-B 330, the access point 310 may perform other operations (block 1018) (e.g., send data to only STA-A via an SU transmission if there is data queued for only STA-A, or similarly send data to only STA-B via an SU transmission if there is data queued for only STA-B, or other operations, or return back to block 1002).

If, in block 1002, the access point 310 determines that there is data queued for both STA-A 320 and STA-B 330, the access point consults the PER-Goodput tables associated with the favored STA-i to determine the $MCS_i$ and $Nss_i$ that maximizes the goodput for STA-i (block 1004). Based on consulting the PER-Goodput tables, the access point 310 selects the $MCS_i$ and $Nss_i$ for transmitting data to STA-i via an MU-2 transmission (block 1006).

Then, the access point 310 consults the PER-Goodput tables to determine the $MCS_j$ and $Nss_j$ that maximizes the goodput for the unfavored STA-j based on the selected $Nss_i$ for the favored STA-i (block 1008). Based on consulting the tables, the access point 310 selects the $MCS_j$ and $Nss_j$ for transmitting data to STA-j via an MU-2 transmission (block 1010).

The access point 310 then simultaneously transmits a set of data frames to STA-i and STA-j via an MU-2 transmission, wherein each of the data frames includes a first data payload for STA-i transmitted using the selected $MCS_i$ and $Nss_i$ and a second data payload for STA-j transmitted using the selected $MCS_j$ and $Nss_j$ (block 1012). Then, the access point 310 receives $Block\_ACK_i$ and $Block\_ACK_j$ from STA-i and STA-j, respectively (block 1014).

Then, the access point 310 updates the PER-Goodput entries corresponding to the selected $MCS_i$ and $Nss_i$ of STA-i based on the current PER information received via the $Block\_ACK_i$, and updates the PER-Goodput entries corresponding to the selected $MCS_j$ and $Nss_j$ of STA-j based on the current PER information received via the $Block\_ACK_j$ (block 1016). As previously discussed, the updated PER may be equal to a first weight (e.g., ⅞) multiplied by the previous PER plus a second weight (e.g., ⅛) multiplied by the current PER.

The access point 310 then sets the new fairness variable i to the previous fairness variable j and sets the new fairness variable j to the previous fairness variable i (block 1017). In other words, the access point 310 will favor the unfavored station in the current transmission in the following transmission (and will not favor the favored station in the current transmission in the following transmission). The access point 310 then returns to block 1002 to repeat the process for next transmittal of data to STA-A 320 and STA-B 330.

In method 900, the access point 310 favored one of the user devices (e.g., STA-A 320) over another (e.g., STA-B 330). In method 1000, the access point 310 toggled the favoritism of the user devices. In the following method 1100, the access point 310 sets the $MCS_A$ and $Nss_A$ for STA-A 320 and $MCS_B$ and $Nss_B$ for STA-B 330 to maximize the aggregate goodput for STA-A 320 and STA-B 330.

Figure 11:
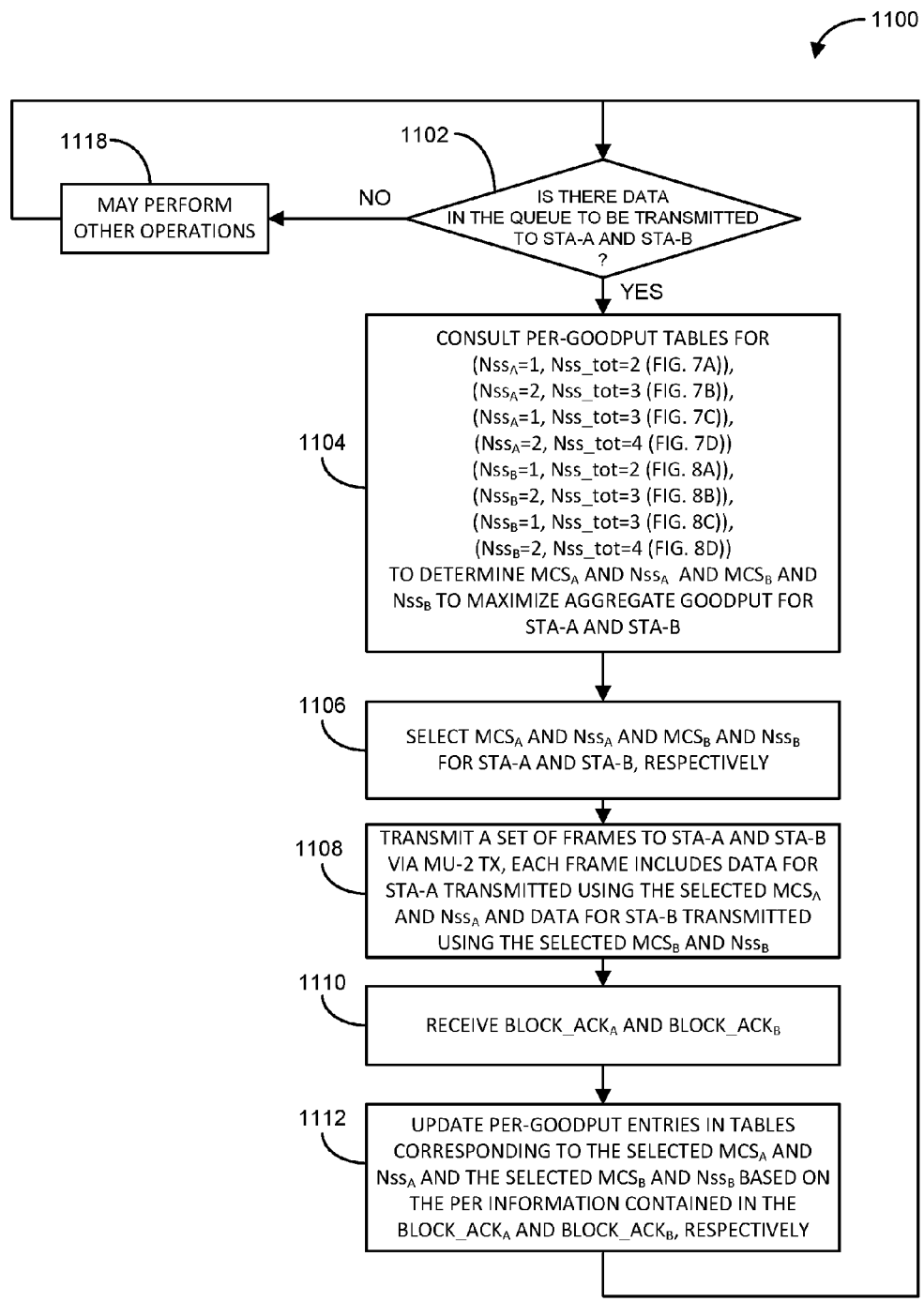
FIG. 11 illustrates a flow diagram of yet another exemplary method of transmitting data to a pair of wireless nodes via an MU-MIMO transmission in accordance with certain aspects of the present disclosure.

FIG. 11 illustrates a flow diagram of another exemplary method 1100 of transmitting data to a pair of stations via a MU-MIMO transmission according to another aspect of the disclosure. The method 1100 may be performed by the access point 310 in transmitting data to STA-A 320 and STA-B 330 via a MU-MIMO transmission. In method 1100, the access point 310 selects the $MCS_A$ and $Nss_A$ for STA-A 320 and the $MCS_B$ and $Nss_B$ STA-B 330 to maximize the aggregate goodput for STA-A 320 and STA-B 330.

According to the method 1100, the access point 310 determines whether data is queued for transmission to both STA-A 320 and STA-B 330 (block 1102). If the access point 310 determines that there is no data for transmission for both STA-A 320 and STA-B 330, the access point may perform other operations (block 1118) (e.g., send data to only STA-A if there is data queued for only STA-A, or send data to only STA-B if there is data queued for only STA-B, or other operations, or return back to block 1102).

If, in block 1102, the access point 310 determines that there is data queued for both STA-A 320 and STA-B 330, the access point consults the PER-Goodput tables 7A-7D for STA-A 320 and the PER-Goodput tables 8A-8D for STA-B 330 to determine the $MCS_A$ and $Nss_A$ for STA-A 320 and $MCS_B$ and $Nss_B$ for STA-B 330 that achieves a maximum estimated aggregate goodput for both STA-A 320 and STA-B 330 (block 1104). Because there is interplay between the individual estimated goodputs for STA-A and STA-B 330, the maximum aggregate goodput need not coincide with either or both the maximum goodput for STA-A 320 and the maximum goodput for STA-B 330.

For example, the maximum aggregate goodput may coincide with the maximum goodput for STA-A 320, but may not coincide with the maximum goodput for STA-B 330. This may be the case where the maximum goodput for STA-A 320 may be $Rate_A(9, 2, 3, 3)$ indicated in Table of FIG. 7B. But this Table applies to the case where the total number of spatial streams for STA-B 330 is one (e.g., $Nss_B=1$). However, the maximum estimated goodput rate for STA-B 330 may pertain to the case where the total number of spatial streams for STA-B 330 is two (e.g., $Nss_B=2$), as may be indicated in the Table of FIG. 8B.

Similarly, the maximum aggregate goodput may coincide with the maximum goodput for STA-B 330, but may not coincide with the maximum goodput for STA-A 320. This may be the case where the maximum goodput for STA-B 330 may be $Rate_B(9, 2, 3, 3)$ indicated in Table of FIG. 8B. But this Table applies to the case where the total number of spatial streams for STA-A 320 is one (e.g., $Nss_A=1$). However, the maximum estimated goodput rate for STA-A 320 may pertain to the case where the total number of spatial streams for STA-A 320 is two (e.g., $Nss_A=2$), as may be indicated in the Table of FIG. 7B.

Further, in this regard, the maximum aggregate goodput may not coincide with neither the maximum goodput for STA-A 320 nor the maximum goodput for STA-B 330. In particular, the maximum aggregate goodput may coincide with an intermediate goodput for STA-A 320 and an intermediate goodput for STA-B 330. As an example, the maximum aggregate goodput may coincide with MCS-6 and two spatial streams $Nss_A=2$ for STA-A 320 as may be indicated in Table of FIG. 7D, and MCS-6 and two spatial streams $Nss_B=2$ for STA-B 330 as may be indicated in Table of FIG. 8D. However, the individual maximum aggregate goodput for STA-A 320 may be MCS-9 with two spatial streams $Nss_A=2$ for STA-A 320 with one spatial stream $Nss_B=1$ for STA-B 330 as indicated in Table FIG. 7B; and the individual maximum aggregate goodput for STA-B 330 may be MCS-9 with two spatial streams $Nss_B=2$ for STA-B 330 with one spatial stream $Nss_A=1$ for STA-A 320 as indicated in Table FIG. 8B. Both these individual maximum goodputs may be mutually exclusive.

Based on consulting the tables 7A-7D and 8A-8D, the access point 310 selects $MCS_A$ and $Nss_A$ the $MCS_B$ and $Nss_B$ for STA-A 320 and STA-B 330, respectively (block 1106). The access point 310 then simultaneously transmits a set of data frames to STA-A 320 and STA-B 330 via an MU-2 transmission, wherein each of the frames includes a first data payload for STA-A 320 transmitted using the selected $MCS_A$ and $Nss_A$ and a second data payload for STA-B 330 transmitted using the selected $MCS_B$ and $Nss_B$ (block 1108). Then, the access point 310 receives $Block\_ACK_A$ and $Block\_ACK_B$ from STA-A 320 and STA-B 330, respectively (block 1110).

Then, the access point 310 updates the PER-Goodput entries corresponding to the selected $MCS_A$ and $Nss_A$ of STA-A 320 based on the current PER information received via the $Block\_ACK_A$, and updates the PER-Goodput entries corresponding to the selected $MCS_B$ and $Nss_B$ of STA-B 330 based on the current PER information received via the $Block\_ACK_B$ (block 1112). As previously discussed, the updated PER may be equal to a first weight (e.g., ⅞) multiplied by the previous PER plus a second weight (e.g., ⅛) multiplied by the current PER. The access point 310 then returns to block 1102 to repeat the process for next transmission of data to STA-A 320 and/or STA-B 330.

The access point 310 may dynamically change which method 900, 1000, or 1100 to implement based on one or more conditions.

Figure 12:
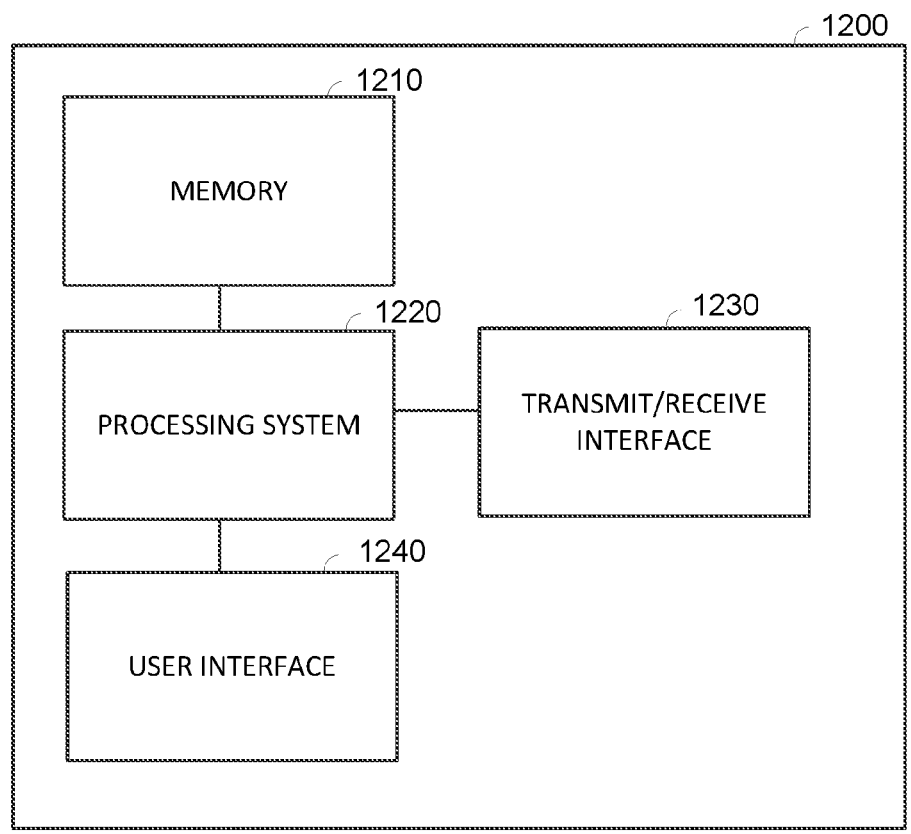
FIG. 12 illustrates a block diagram of an exemplary wireless node in accordance with certain aspects of the present disclosure.

FIG. 12 illustrates an example device 1200 according to certain aspects of the present disclosure. The device 1200 may be configured to operate in an access point or a user device to perform the one or more of the operations described herein. The device 1200 includes a processing system 1220, and a memory 1210 coupled to the processing system 1220. The memory 1210 may store instructions that, when executed by the processing system 1220, cause the processing system 1220 to perform one or more of the operations described herein. Exemplary implementations of the processing system 1220 are provided below. The device 1200 also comprises a transmit/receiver interface 1230 coupled to the processing system 1220. The interface 1230 (e.g., interface bus) may be configured to interface the processing system 1220 to a radio frequency (RF) front end (e.g., transceivers 226-1 to 226-N or 266-1 to 226-M), as discussed further below.

In certain aspects, the processing system 1220 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1220 may generate a frame and output the frame to an RF front end (e.g., transceivers 226-1 to 226-N or 266-1 to 266-M) via the interface 1230 for wireless transmission (e.g., to an access point or a user device).

In certain aspects, the processing system 1220 may include one or more of the following: a receive processor (e.g., receive processor 242 or 282), a receive data processor (e.g., receive data processor 244 or 284) and/or a controller (e.g., controller 234 and 274) for performing one or more of the operations described herein. In these aspects, the processing system 1220 may receive a frame from an RF front end (e.g., transceivers 226-1 to 226-N or 266-1 to 266-M) via the interface 1230 and process the frame according to any one or more of the aspects discussed above.

In the case of a user device, the device 1200 may include a user interface 1240 coupled to the processing system 1220. The user interface 1240 may be configured to receive data from a user (e.g., via keypad, mouse, joystick, etc.) and provide the data to the processing system 1220. The user interface 1240 may also be configured to output data from the processing system 1220 to the user (e.g., via a display, speaker, etc.). In this case, the data may undergo additional processing before being output to the user. In the case of an access point 210, the user interface 1240 may be omitted.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For instance, some examples of means for determining a first modulation coding scheme (MCS) for transmitting data to a first wireless node via a multi-user multiple-input-multiple-output (MU-MIMO) transmission based on a total number of spatial streams to be used in the MU-MIMO transmission include the processing system 1220, controller 234, and controller 274. Some examples of means for generating a first frame for transmission to the first wireless node, wherein the first frame includes a first data payload modulated and coded using the first MCS include the processing system 1220, transmit data processors 220 and 260, and frame builders 222 and 262. Some examples of means for outputting the first frame for transmission to the first wireless node via the MU-MIMO transmission include the transmit/receive interface 1230, transmit processor 224, and transmit processor 264.

Some examples of means for determining the first MCS based on a total number of wireless nodes expected to receive data via the MU-MIMO transmission include the processing system 1220, controller 234, and controller 274. Some examples of means for determining a number of one or more spatial streams based on an expected data rate selected from a set of expected data rates corresponding to different numbers of one or more spatial streams for transmitting data to the first wireless node via the MU-MIMO transmission include the processing system 1220, controller 234, and controller 274. Some examples of means for outputting the first frame for transmission to the first wireless node via the one or more spatial streams include the transmit/receive interface 1230, transmit processor 224, and transmit processor 264.

Some examples of means for obtaining information related to a data error rate associated with the transmission of the first frame to the first wireless node via the MU-MIMO transmission include the processing system 1220, controller 234, and controller 274. Some examples of means for determining an expected data rate corresponding to a set including the first MCS and the total number of spatial streams based on the data error rate information include the processing system 1220, controller 234, and controller 274. Some examples of means for determining a second MCS for transmitting data to the first wireless node via another MU-MIMO transmission based on the expected data rate include the processing system 1220, controller 234, and controller 274. Some examples of means for generating a second frame for transmission to the first wireless node, wherein the second frame includes a second data payload modulated and coded using the second MCS include the processing system 1220, transmit data processors 220 and 260, and frame builders 222 and 262. Some examples of means for outputting the second frame for transmission to the first wireless node via the another MU-MIMO transmission include the transmit/receive interface 1230, transmit processor 224, and transmit processor 264.

Some examples of means for determining a second MCS for transmitting data to a second wireless node via the MU-MIMO transmission based on the total number of spatial streams to be used in the MU-MIMO transmission include the processing system 1220, controller 234, and controller 274. Some examples of means for configuring the first frame for transmission to the second wireless node, wherein the first frame includes a second data payload modulated and coded using the second MCS include the processing system 1220, transmit data processors 220 and 260, and frame builders 222 and 262. Some examples of means for outputting the second frame for transmission to the second wireless node via the MU-MIMO transmission include the transmit/receive interface 1230, transmit processor 224, and transmit processor 264.

Some examples of means for selecting a first expected data rate from a first set of expected data rates corresponding to different MCSs for transmitting data to the first wireless node include the processing system 1220, controller 234, and controller 274. Some examples of means for selecting a second expected data rate from a second set of expected data rates corresponding to different MCSs for transmitting data to the second wireless node include the processing system 1220, controller 234, and controller 274.

Some examples of means for determining a first number of one or more spatial streams based on a first selected expected data rate for transmitting data to the first wireless node include the processing system 1220, controller 234, and controller 274. Some examples of means for determining the second MCS and a second number of one or more spatial streams based on the first number of one or more spatial streams include the processing system 1220, controller 234, and controller 274. Some examples of means for outputting the first frame for transmission to the first wireless node via the one or more spatial streams and to the second wireless device via the second number of one or more spatial streams include the transmit/receive interface 1230, transmit processor 224, and transmit processor 264.

Some examples of means for determining a third MCS for transmitting data to the second wireless node via another MU-MIMO transmission based on a total number of spatial streams to be used in the another MU-MIMO transmission include the processing system 1220, controller 234, and controller 274. Some examples of means for determining a third number of one or more spatial streams for transmitting data to the second wireless node via the another MU-MIMO transmission include the processing system 1220, controller 234, and controller 274. Some examples of means for determining a fourth MCS and a fourth number of one or more spatial streams for transmitting data to the first wireless node via the another MU-MIMO transmission based the second number of one or more spatial streams include the processing system 1220, controller 234, and controller 274.

Some examples of means for generating a second frame for transmission to the second wireless node, wherein the second frame includes a third data payload modulated and coded using the third MCS and a fourth data payload modulated and coded using the fourth MCS include the processing system 1220, transmit data processors 220 and 260, and frame builders 222 and 262 Some examples of means for outputting the second frame for transmission to the second wireless node and the first wireless node via the third number of one or more spatial streams and the fourth number of one or more spatial streams of the another MU-MIMO transmission, respectively, include the transmit/receive interface 1230, transmit processor 224, and transmit processor 264.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It shall be understood that the processing as described herein may be performed by any digital means as discussed above, and or any analog means or circuitry.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of any of the user devices 106 and 110 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to:
determine a first modulation coding scheme (MCS) for transmitting data to a first wireless node via a multi-user multiple-input-multiple-output (MU-MIMO) transmission based on a total number of spatial streams to be used in the MU-MIMO transmission, wherein the processing system is further configured to determine the first MCS based on a total number of wireless nodes expected to receive data via the MU-MIMO transmission; and
generate a first frame for transmission to the first wireless node, wherein the first frame includes a first data payload modulated and coded using the first MCS;
an interface configured to output the first frame for transmission to the first wireless node via the MU-MIMO transmission.

2. The apparatus of claim 1,
wherein the processing system is further configured to determine a number of one or more spatial streams based on an expected data rate selected from a set of expected data rates corresponding to different numbers of one or more spatial streams for transmitting the first frame to the first wireless node via the MU-MIMO transmission; and
wherein the interface is configured to output the first frame for transmission to the first wireless node via the one or more spatial streams.

3. The apparatus of claim 1, wherein the processing system is further configured to determine the first MCS based on an expected data rate selected from a set of expected data rates corresponding to different MCSs for transmitting data to the first wireless node.

4. The apparatus of claim 3, wherein the expected data rate comprises an expected goodput for the transmission of the first frame to the first wireless node.

5. The apparatus of claim 1,
wherein the processing system is further configured to:
obtain information related to a data error rate associated with the transmission of the first frame to the first wireless node via the MU-MIMO transmission;
determine an expected data rate corresponding to a set including the first MCS and the total number of spatial streams based on the data error rate information;
determine a second MCS for transmitting data to the first wireless node via another MU-MIMO transmission based on the expected data rate; and
generate a second frame for transmission to the first wireless node, wherein the second frame includes a second data payload modulated and coded using the second MCS; and
wherein the interface is further configured to output the second frame for transmission to the first wireless node via the another MU-MIMO transmission.

6. The apparatus of claim 1,
wherein the processing system is further configured to:
   determine a second MCS for transmitting data to a second wireless node via the MU-MIMO transmission based on the total number of spatial streams to be used in the MU-MIMO transmission; and
   configure the first frame for transmission to the second wireless node, wherein the first frame includes a second data payload modulated and coded using the second MCS; and
wherein the interface is further configured to output the first frame for transmission to the second wireless node via the MU-MIMO transmission.

7. The apparatus of claim 6, wherein the processing system is further configured to:
   determine the first MCS by selecting a first expected data rate from a first set of expected data rates corresponding to different MCSs for transmitting data to the first wireless node;
   determine the second MCS by selecting a second expected data rate from a second set of expected data rates corresponding to different MCSs for transmitting data to the second wireless node;
   wherein the selection of the first expected data rate and the second expected data rate achieves a maximum expected aggregate data rate for the MU-MIMO transmission.

8. The apparatus of claim 6,
wherein the processing system is further configured to:
   determine a first number of one or more spatial streams based on a first selected expected data rate for transmitting data to the first wireless node; and
   determine the second MCS and a second number of one or more spatial streams based on the first number of one or more spatial streams;
wherein the interface is further configured to output the first frame for transmission to the first wireless node via the first number of one or more spatial streams and to the second wireless node via the second number of one or more spatial streams.

9. The apparatus of claim 8,
wherein the processing system is configured to:
   determine a third MCS for transmitting data to the second wireless node via another MU-MIMO transmission based on a total number of spatial streams to be used in the another MU-MIMO transmission;
   determine a third number of one or more spatial streams for transmitting data to the second wireless node via the another MU-MIMO transmission;
   determine a fourth MCS and a fourth number of one or more spatial streams for transmitting data to the first wireless node via the another MU-MIMO transmission based the third number of one or more spatial streams;
   generate a second frame for transmission to the second wireless node and the first wireless node, wherein the second frame includes a third data payload modulated and coded using the third MCS and a fourth data payload modulated and coded using the fourth MCS; and
wherein the interface is configured to output the second frame for transmission to the second wireless node and the first wireless node via the third number of one or more spatial streams and the fourth number of one or more spatial streams of the another MU-MIMO transmission, respectively.

10. The apparatus of claim 1, wherein the total number of spatial streams is greater than a total number of wireless nodes expected to receive the MU-MIMO transmission.

11. A method for wireless communication, comprising:
   determining a first modulation coding scheme (MCS) for transmitting data to a first wireless node via a multi-user multiple-input-multiple-output (MU-MIMO) transmission based on a total number of spatial streams to be used in the MU-MIMO transmission, wherein determining the first MCS comprises determining the first MCS based on a total number of wireless nodes expected to receive data via the MU-MIMO transmission;
   generating a first frame for transmission to the first wireless node, wherein the first frame includes a first data payload modulated and coded using the first MCS; and
   outputting the first frame for transmission to the first wireless node via the MU-MIMO transmission.

12. The method of claim 11, further comprising:
   determining a number of one or more spatial streams based on an expected data rate selected from a set of expected data rates corresponding to different numbers of one or more spatial streams for transmitting the first frame to the first wireless node via the MU-MIMO transmission; and
   wherein outputting the first frame comprises outputting the first frame for transmission to the first wireless node via the one or more spatial streams.

13. The method of claim 11, wherein determining the first MCS comprises determining the first MCS based on a selected expected data rate for the transmission of data to the first wireless node.

14. The method of claim 13, wherein the expected data rate comprises an expected goodput for transmitting the first frame to the first wireless node.

15. The method of claim 11, further comprising:
   obtaining information related to a data error rate associated with the transmission of the first frame to the first wireless node via the MU-MIMO transmission;
   determining an expected data rate corresponding to a set including the first MCS and the total number of spatial streams based on the data error rate information;
   determining a second MCS for transmitting data to the first wireless node via another MU-MIMO transmission based on the expected data rate;
   generating a second frame for transmission to the first wireless node, wherein the second frame includes a second data payload modulated and coded using the second MCS; and
   outputting the second frame for transmission to the first wireless node via the another MU-MIMO transmission.

16. The method of claim 11, further comprising:
   determining a second MCS for transmitting data to a second wireless node via the MU-MIMO transmission based on the total number of spatial streams to be used in the MU-MIMO transmission;
   configuring the first frame for transmission to the second wireless node, wherein the first frame includes a second data payload modulated and coded using the second MCS; and
   outputting the first frame for transmission to the second wireless node via the MU-MIMO transmission.

17. The method of claim 16, wherein:
- determining the first MCS comprises selecting a first expected data rate from a first set of expected data rates corresponding to different MCSs for transmitting data to the first wireless node;
- determining the second MCS comprises selecting a second expected data rate from a second set of expected data rates corresponding to different MCSs for transmitting data to the second wireless node; and
- selecting the first expected data rate and the second expected data rate achieves a maximum expected aggregate data rate for the MU-MIMO transmission.

18. The method of claim 16, further comprising:
- determining a first number of one or more spatial streams based on a first selected expected selected data rate for transmitting data to the first wireless node;
- determining the second MCS and a second number of one or more spatial streams based on the first number of one or more spatial streams; and
- outputting the first frame for transmission to the first wireless node via the first number of one or more spatial streams and to the second wireless node via the second number of one or more spatial streams.

19. The method of claim 18, further comprising:
- determining a third MCS for transmitting data to the second wireless node via another MU-MIMO transmission based on a total number of spatial streams to be used in the another MU-MIMO transmission;
- determining a third number of one or more spatial streams for transmitting data to the second wireless node via the another MU-MIMO transmission;
- determining a fourth MCS and a fourth number of one or more spatial streams for transmitting data to the first wireless node via the another MU-MIMO transmission based the third number of one or more spatial streams;
- generating a second frame for transmission to the second wireless node and the first wireless node, wherein the second frame includes a third data payload modulated and coded using the third MCS and a fourth data payload modulated and coded using the fourth MCS; and
- outputting the second frame for respective transmission to the second wireless node and the first wireless nodes via the third number of one or more spatial streams and the fourth number of one or more spatial streams of the another MU-MIMO transmission, respectively.

20. The method of claim 11, wherein the total number of spatial streams is greater than a total number of wireless nodes expected to receive the MU-MIMO transmission.

21. A wireless node, comprising:
- a processing system configured to:
  - determine a first modulation coding scheme (MCS) for transmitting data to a first wireless node via a multi-user multiple-input-multiple-output (MU-MIMO) transmission based on a total number of spatial streams to be used in the MU-MIMO transmission, wherein the processing system is further configured to determine the first MCS based on a total number of wireless nodes expected to receive data via the MU-MIMO transmission; and
  - generate a first frame for transmission to the first wireless node, wherein the first frame includes a first data payload modulated and coded using the first MCS; and
- a transmitter configured to transmit the first frame to the first wireless node via the MU-MIMO transmission.

22. The wireless node of claim 21, wherein the total number of spatial streams is greater than a total number of wireless nodes expected to receive the MU-MIMO transmission.

* * * * *